United States Patent
Yamamoto (10) Patent No.: US 7,635,050 B2
(45) Date of Patent: Dec. 22, 2009

(54) ELECTRIC BRAKE ASSEMBLY (75) Inventor: Ken Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 481 days.

(21) Appl. No.: 11/184,780

(22) Filed: Jul. 20, 2005

(65) Prior Publication Data
US 2006/0021831 A1 Feb. 2, 2006

(30) Foreign Application Priority Data

Jul. 29, 2004 (JP) .......................... 2004-222236
Aug. 9, 2004 (JP) .......................... 2004-232049

(51) Int. Cl.
F16D 65/00 (2006.01)
F16D 13/76 (2006.01)

(52) U.S. Cl. .................. 188/73.1; 188/72.8; 192/12 B; 192/18 R (58) Field of Classification Search ............... 188/71.7, 188/73.1, 73.32, 72.7, 72.8, 156, 157, 196 V; 192/12 R, 14, 16, 18 R, 12 B
See application file for complete search history.

(56) References Cited

U.S. PATENT DOCUMENTS

| | | | |
|---|---|---|---|
| 3,789,959 A * | 2/1974 | Kawaguchi | 188/71.9 |
| 3,952,844 A * | 4/1976 | Newstead et al. | 188/72.8 |
| 4,429,768 A * | 2/1984 | Margetts et al. | 188/71.9 |
| 4,809,824 A * | 3/1989 | Fargier et al. | 188/72.8 |
| 4,958,712 A * | 9/1990 | Suganuma et al. | 192/70.12 |
| 5,630,196 A * | 5/1997 | Swain | 399/117 |
| 6,412,607 B2 * | 7/2002 | Ohba et al. | 188/71.9 |

FOREIGN PATENT DOCUMENTS

| | | |
|---|---|---|
| JP | 2546348 | 5/1997 |
| JP | 11-257382 | 9/1999 |
| JP | 2000-283195 | 10/2000 |
| JP | 2002-213505 | 7/2002 |

OTHER PUBLICATIONS

Japanese Office Action issued Apr. 14, 2009 (with partial English translation) in a Japanese application that is a foreign counterpart to the present application.

* cited by examiner

Primary Examiner—Melody M Burch
(74) Attorney, Agent, or Firm—Wenderoth, Lind and Ponack, L.L.P.

(57) ABSTRACT

An electric brake assembly includes an electric motor having a rotor in which a nut of a ball screw is fitted. A brake pad is coupled through a presser member to the threaded shaft of the ball screw. A bolt is threaded into the threaded shaft. A snap ring is mounted around a large-diameter portion of the bolt with its radially outer edge pressed against the radially inner surface of the rotor of the motor so that its radially outer portion is inclined obliquely rearwardly toward its radially outer edge. When the rotor is rotated in the forward rotational direction, the threaded shaft can move forwardly to press the brake pads against the disc rotor. When the motor is deactivated, the threaded shaft cannot retract after it has abutted the snap ring because the snap ring cannot move rearwardly relative to the rotor.

8 Claims, 9 Drawing Sheets

ELECTRIC BRAKE ASSEMBLY

BACKGROUND OF THE INVENTION

The present invention relates to an electric brake assembly including an electric motor having a rotary member, and a mechanism for converting the rotary motion of the rotary member of the motor to a linear motion of a linearly movable member to press a first brake member such as brake pads against a second brake member such as a brake rotor.

Hydraulic brake systems account for by far the majority of the current vehicle brake systems. But with the recent increasing popularity of sophisticated high-tech brake systems such as anti-lock brake systems (ABS), electric brake assemblies are gathering attention because they need no hydraulic circuits, which require complicated control, and thus are compact. An electric brake assembly includes an electric motor having a rotary member, and a driving force conversion mechanism for converting the rotary motion of the rotary member of the motor to a linear motion of a linearly movable member to press a first brake member against a second brake member.

Since such an electric brake assembly is mounted under each spring of a vehicle suspension, it has to be as small in size and lightweight as possible. For this purpose, the linearly movable member is typically in threaded engagement with the rotary member of the motor. In many cases, as disclosed in JP patent publications 2002-213505 (Publication 1) and 2000-283195 (Publication 2), the linearly movable member and the rotary member of the motor constitute a ball screw because a ball screw can convert rotary motion to linear motion with minimum frictional resistance. Some other conventional electric brake assemblies include a driving force conversion mechanism in the form of a cam assembly which comprises two cam members having axially opposing cam faces, and a plurality of rolling elements disposed between and held in engagement with the cam faces. It is desired that such an electric brake assembly have additionally a parking brake function so that this function serves as a backup of the electric brake function in case of failure of the latter (see JP utility model publication 2546348; Publication 3).

The first brake member (which is typically a brake pad or pads) gradually becomes worn by frictional contact with the second brake member (brake rotor). As the first brake member is worn, the position of the linearly movable member when the brake is not applied (this position is herein referred to as "standby" position) has to be gradually moved toward the brake rotor to ensure sufficiently quick response of braking.

Publication 1, however, does not disclose moving the standby position toward the brake rotor according to the degree of wear of the first brake member. In this publication 1, to apply the brake, the rotor of the electric motor, which is a nut member of a ball screw, is rotated in the forward rotational direction to move the threaded shaft of the ball screw, or the linearly movable member in the forward direction. To release the brake, the rotor of the motor is rotated in the reverse rotational direction to separate the first brake member from the second brake member and then rotated in the forward rotational direction until the linearly movable member returns to the original standby position. Thus, the original standby position remains unchanged even when the first brake member becomes worn.

The electric brake assembly disclosed in Publication 2 includes an adjusting screw between the driving force conversion mechanism and a piston as the linearly movable member, and a limiter and a one-way clutch disposed between the adjusting screw and the rotor of the electric motor. The limiter transmits only a rotation of the rotor that exceeds a predetermined range. Thus, when the rotation of the rotor during braking exceeds the predetermined range, the reverse rotation of the rotor thereafter is transmitted to the adjusting screw through the one-way clutch. The piston is thus advanced toward the second brake member or disc rotor by an amount corresponding to the degree of wear of the first brake member or brake pads.

In the electric brake assembly disclosed in Publication 1, in order to move the standby position of the linearly movable member according to the degree of wear of the first brake member, it will be necessary to provide a sensor for detecting the degree of wear of the first brake member, and a controller for changing the standby position according to the degree of wear of the first brake member as detected by the sensor. The addition of the sensor and the controller would complicate the entire assembly.

The electric brake assembly of Publication 2 needs no such sensor or controller to adjust the standby position according to the degree of wear of the brake pad. But still, it needs a large number of parts and is complicated in structure. It is therefore difficult to reduce the size and weight of such a brake assembly to a sufficient degree as an electric brake assembly. The manufacturing cost also tends to be high.

Further, in either of the brake assemblies disclosed in Publications 1 and 2, the electric motor has to be turned in the reverse rotational direction to release the brake, so that the brake cannot always be released sufficiently quickly, which will give uncomfortable feeling to the driver. Also, since these brake assemblies have no parking brake functions, nothing can serve as a backup of the electric brake function in case of failure of the electric brake function.

An object of the present invention is to provide an electric brake assembly which includes the function of moving the linearly movable member according to the degree of wear of the brake pads and the parking brake function, and is still sufficiently compact as an electric brake assembly.

SUMMARY OF THE INVENTION

According to the present invention, there is provided an electric brake assembly comprising an electric motor including a rotary member, a linearly movable member, a first brake member coupled to the linearly movable member, a second brake member, a driving force conversion mechanism for converting a rotary motion of the rotary member to a linear motion of the linearly movable member in forward and backward directions, the forward direction being such a direction that the first brake member is moved toward and pressed against the second brake member, the backward direction being such a direction that the first brake member separates from the second brake member, and a one-way clutch that allows the linear motion of the linearly movable member in the forward direction and restricts the linear motion of the linearly movable member in the backward direction.

According to the present invention, simply by adding the one-way clutch, the first brake member can be always located sufficiently close to the second brake member while the brake is not applied, irrespective of the degree of wear of the first brake member, without the need to increase the size and weight of the electric brake assembly.

In a preferred arrangement, the rotary member is a cylindrical member and the driving force conversion mechanism comprises a thread mechanism provided on a radially inner surface of the cylindrical rotary member, the linearly movable member extending through the cylindrical rotary member and being coupled thereto through the thread mechanism, the forward and backward directions being parallel to an axis of the cylindrical rotary member, the one-way clutch comprising a member engaging the radially inner surface of the cylindrical rotary member so as to be rotatable relative the linearly movable member.

Preferably, an axial play is present between the one-way clutch and the linearly movable member so that when the brake is released, the first brake member can automatically separate from the second brake member by a distance equal to this play.

The one-way clutch is preferably an annular snap ring having two opposed ends that are circumferentially spaced apart from each other by a cutout, the snap ring having a radially outer edge that is pressed against the radially inner surface of the cylindrical rotary member along a contact line at an acute angle with respect to a portion of the radially inner surface of the cylindrical rotary member forwardly of the contact line. Such a one-way clutch is simple in structure and lightweight.

The snap ring is preferably made of spring steel so that the snap ring has a damping function.

A portion of the radially inner surface of the cylindrical rotary member where the one-way clutch engages is preferably a rough surface so that the one-way clutch works more reliably and effectively.

Preferably, the rough surface has a roughness average RA of 6.3 to 50 micrometers. If the RA value is less than 6.3 micrometers, the one-way clutch may not work in a sufficiently reliable and effective manner. If this value is over 50 micrometers, the one-way clutch will encounter large frictional resistance when it is moved in the forward direction together with the linearly movable member.

From another aspect of the invention, there is provided an electric brake assembly comprising an electric motor including a rotary member, a linearly movable member, a first brake member coupled to the linearly movable member, a second brake member, a driving force conversion mechanism for converting a rotary motion of the rotary member to a linear motion of the linearly movable member in forward and backward directions, the forward direction being such a direction that the first brake member is moved toward and pressed against the second brake member, the backward direction being such a direction that the first brake member separates from the second brake member, the driving force conversion mechanism comprising a thread mechanism provided on a radially inner surface of the cylindrical rotary member, the linearly movable member extending through the cylindrical member and coupled thereto through the thread mechanism, a drive shaft adapted to be coupled to and driven by a parking brake, and a parking brake operating force transmission member through which the drive shaft is coupled to the rotary member such that rotation of the drive shaft in a forward rotational direction is transmitted to the rotary member, thereby rotating the rotary member in the forward rotational direction, the forward rotational direction being such a direction that the linearly movable member is moved in the forward direction, thus pressing the first brake member against the second brake member, whereby when the parking brake is operated, the first brake member is pressed against the second member.

Thus, this electric brake assembly has a parking brake function too.

For compactness, the parking brake operating force transmission member preferably comprises an output shaft coupled to the rotary member, and a one-way clutch through which only a rotation of the drive shaft in the forward rotational direction is transmitted to the output shaft.

Preferably, the electric brake assembly further comprises an automatic reverse rotation mechanism for automatically rotating the rotary member in a reverse rotational direction by a predetermined angle after the rotary member has been rotated in the forward rotational direction until the first brake member is pressed against the second brake member and then the force biasing the rotary member in the forward rotational direction has disappeared, thereby separating the first brake member from the second brake member. With this arrangement, the first brake member can be always located sufficiently close to the second brake member while the brake is not applied, irrespective of the degree of wear of the first brake member, without the need to increase the size and weight of the electric brake assembly.

For further compactness of the electric brake assembly, the parking brake operating force transmission member and the automatic reverse rotation mechanism are preferably integrated as a single unit.

Preferably, the brake operating force transmission member comprises an output shaft coupled to the rotary member, and a one-way clutch disposed between the drive shaft and the output shaft for transmitting only rotation of the drive shaft in the forward rotational direction to the output shaft, and the automatic reverse rotation mechanism comprises a torsion coil spring disposed between the rotary member and the output shaft for biasing the rotary member in the reverse rotational direction relative to the output shaft, the output shaft and the rotary member having engaging portions that allow the output shaft and the rotary member to rotate relative to each other by a predetermined angle in both the forward and reverse rotational directions until the engaging portions engage each other, the reverse rotation mechanism further including an arrangement for rotating the output shaft in the reverse rotational direction after the rotary member has been rotated in the forward rotational direction by the drive shaft through the one-way clutch and the output shaft.

Preferably, the output shaft is inserted in the rotary member, and the engaging portions comprise a first protrusion provided on a radially inner surface of the rotary member and a second protrusion provided on a radially outer surface of the output shaft and circumferentially aligned with the first protrusion so as to be engageable with the first protrusion when the output shaft and the rotary member rotate relative to each other.

In a preferred embodiment, the abovementioned arrangement comprises a friction member disposed between the drive shaft and the output shaft for producing a frictional force greater than the biasing force of the torsion coil spring between the drive shaft and the output shaft, whereby the output shaft is rotated together with the drive shaft when the drive shaft is rotated in the reverse rotational direction.

The thread mechanism is preferably a ball screw.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
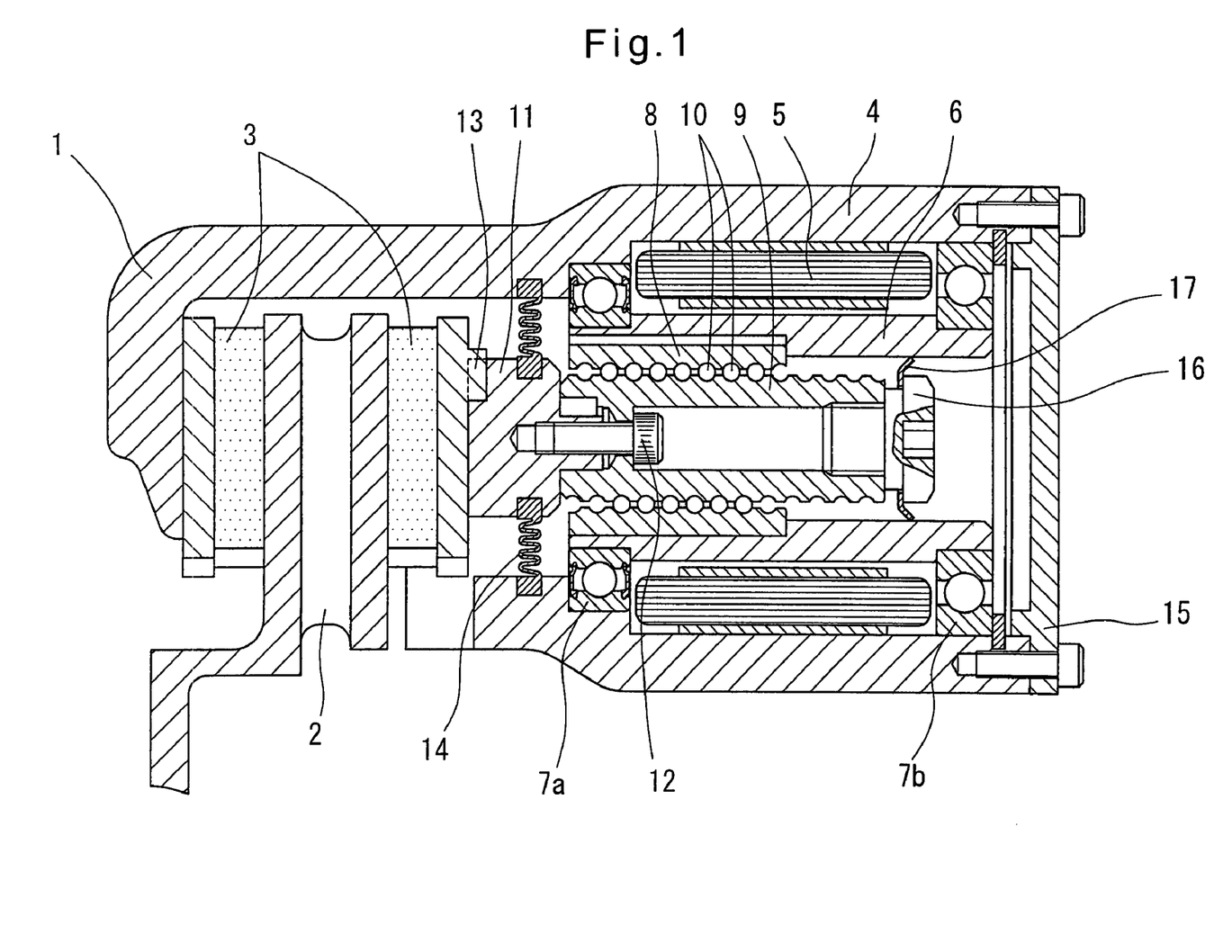
FIG. 1 is a vertical sectional view of an electric brake assembly according to a first embodiment of the present invention.

Now referring to the drawings, FIGS. 1-5 show the electric brake assembly of the first embodiment. As shown in FIG. 1, it is a disc brake assembly including a disc rotor 2, brake pads 3 provided in a caliper 1 and disposed on both sides of the disc rotor 2 so as to be pressed against the disc rotor 2, and an electric motor including a stator 5 fixed to a radially inner surface of a casing 4 which is integral with the caliper 1, and a tubular rotor 6 rotatably supported on the casing 4 through bearings 7a and 7b. The brake assembly shown further includes a ball screw as a driving force conversion mechanism which comprises a nut 8 fitted in the rotor 6 near its axial front end, and a threaded shaft 9 inserted in and in threaded engagement with the nut 8 through balls 10. A separate presser member 11 is mounted on and fixed to the axial front end of the threaded shaft 9 by means of a bolt 12. The presser member 11 is prevented from turning relative to one of the brake pads 3 by means of keys 13. The front opening of the casing 4 is sealed by a boot 14 provided between the caliper 1 and the presser member 11. The rear opening of the casing 4 is closed by a lid 15.

Figure 2A:
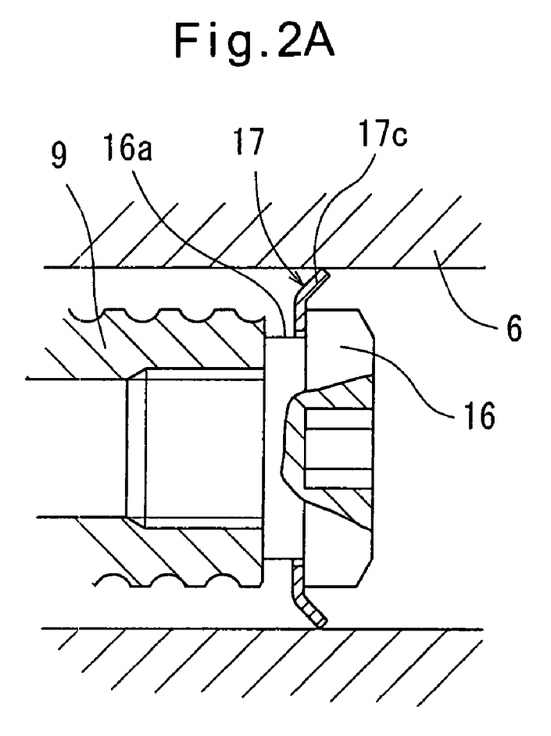
FIGS. 2A and 2B are partial enlarged sectional views of FIG. 1.
Figure 3:
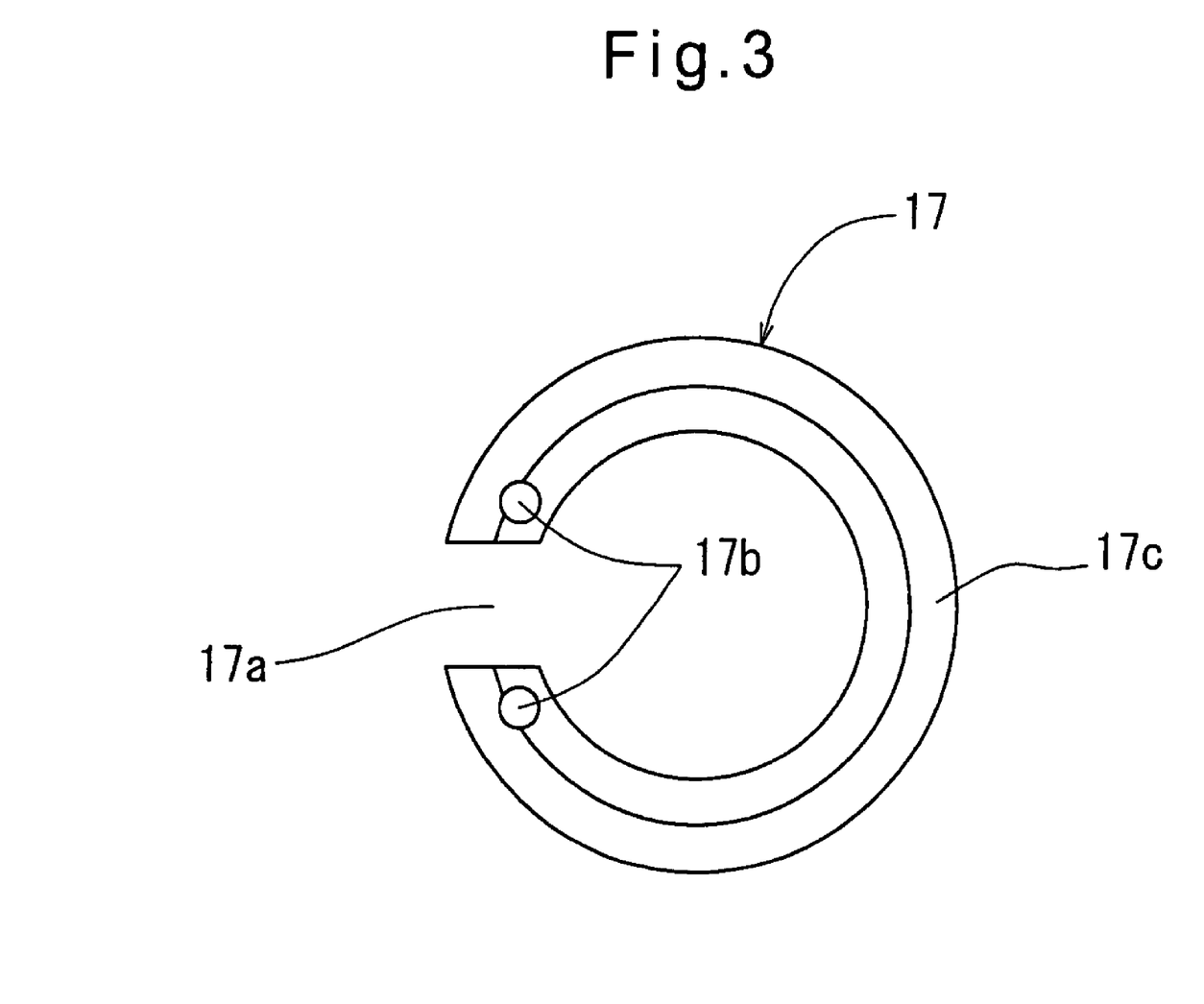
FIG. 3 is a plan view of a snap ring of FIGS. 2A and 2B.

As shown in FIG. 2A, a bolt 16 has its small-diameter portion threaded into the rear end of the threaded shaft 9 of the ball screw. Around a large-diameter portion 16a of the bolt, which is provided rearwardly of the threaded shaft 9, a snap ring 17 is fitted. The snap ring 17 is made of spring steel. As shown in FIG. 3, the snap ring 17 is a ring member having ends that are circumferentially separated from each other by a radial cutout 17a. When it is necessary to replace the brake pads 3 with new ones, the snap ring 17 has to be removed after removing the bolt 16 from the threaded shaft 9. For this purpose, the snap ring 17 is formed with holes near the cutout 17a in which a tool is engaged to radially compress the snap ring 17 and pull it out of the rotor 6.

Figure 2B:
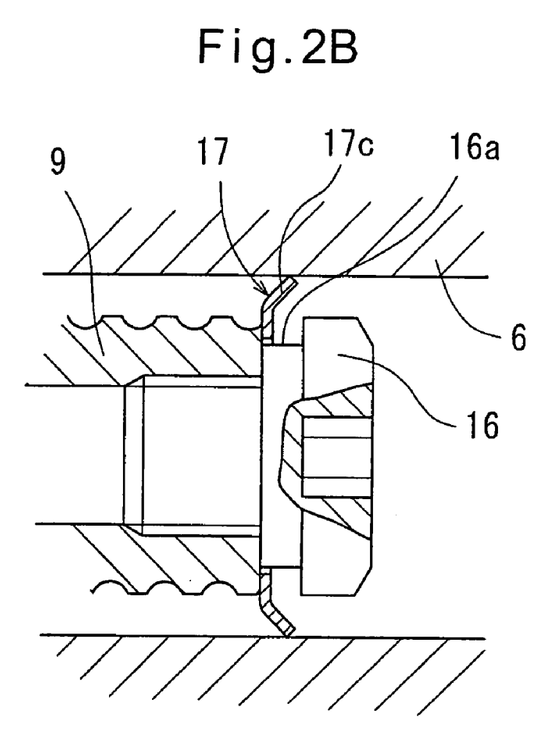

As shown in FIGS. 2A and 2B, the snap ring 17 has its radially inner edge kept out of contact with the large-diameter portion 16a of the bolt 16 so as to be rotatable relative to the bolt 16 and thus the threaded shaft 9. The snap ring 17 has its radially outer portion 17c bent axially rearwardly toward its radially outer edge with the radially outer edge pressed against the radially inner surface of the rotor 6. Thus, when the snap ring 17 is pushed forwardly (toward the brake pads 3) by the bolt 16, it can move forwardly together with the bolt 16 and thus the threaded shaft 9. But when the snap ring 17 is pushed rearwardly by the threaded shaft 9, it prevents backward movement of the threaded shaft 9. This snap ring 17 therefore serves as an axial one-way clutch. In order to maintain suitable frictional resistance between the radially outer edge of the snap ring 17 and the radially inner surface of the rotor 6, the radially inner surface of the rotor 6 is finished to a surface roughness of 6.3 to 50 micrometers in roughness average (Ra).

When the rotor 6 of the electric motor is turned in such a direction that the threaded shaft 9 is advanced to press the pads 3 against the rotor 2 for braking (this direction is hereinafter referred to as "forward rotational direction), the bolt 16 will advance together with the threaded shaft 9 until the head of the advancing bolt 16 abuts the snap ring 17 as shown in FIG. 2A. When the electric motor is deactivated thereafter, the threaded shaft 9 is allowed to move axially rearwardly by a distance equal to a play in the ball screw. Thus, the brake pads 3 can reliably separate from the disc rotor 2 as soon as the motor is deactivated. This prevents dragging of the brake pads 3. But since the snap ring 17 is not movable axially rearwardly, once the rear end of the threaded shaft 9 abuts the snap ring 17 as shown in FIG. 2B, the threaded shaft 9 cannot move rearwardly any further.

Figure 4:
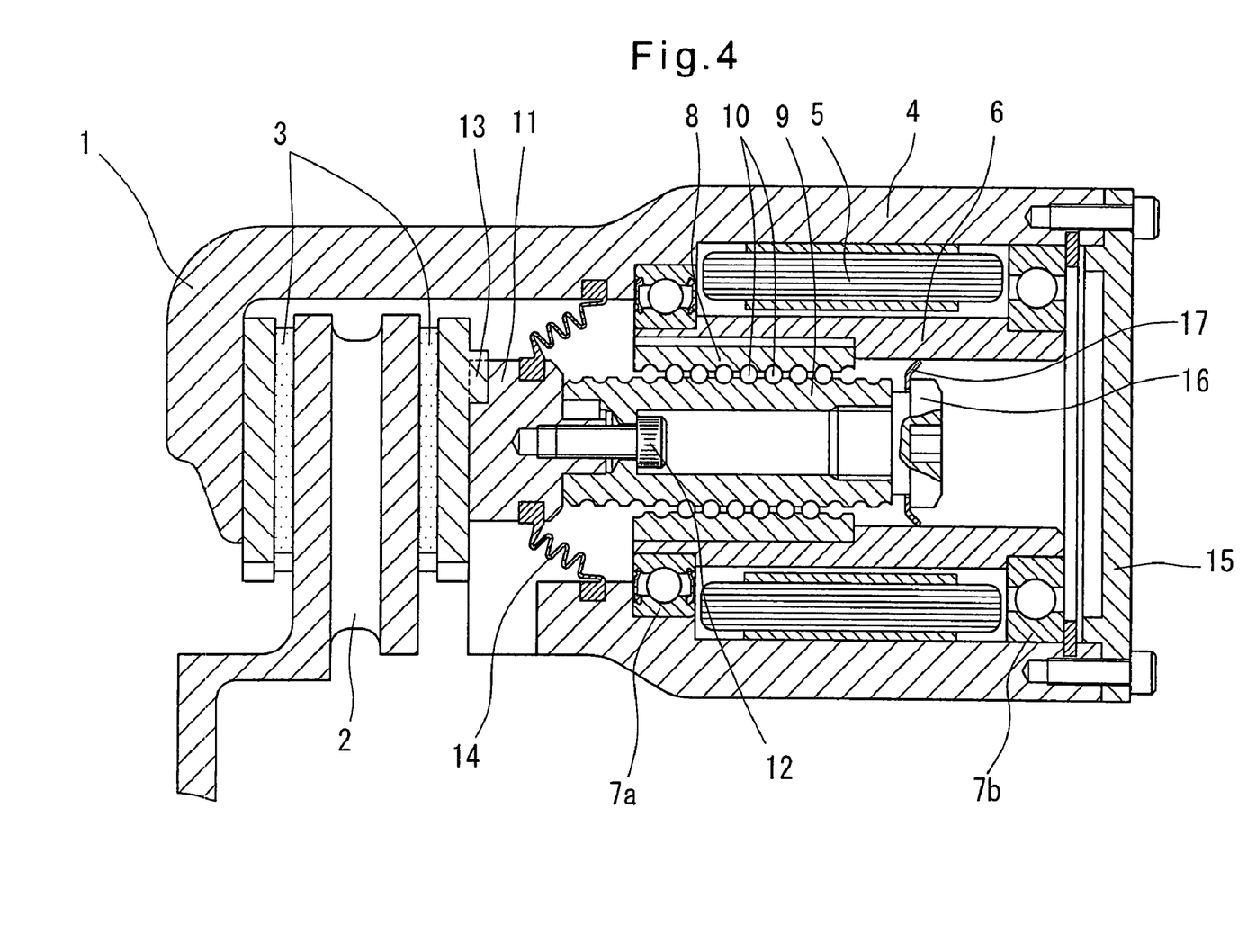
FIG. 4 is a vertical sectional view of the electric brake assembly of FIG. 1 in which the brake pads have become worn.
Figure 5:
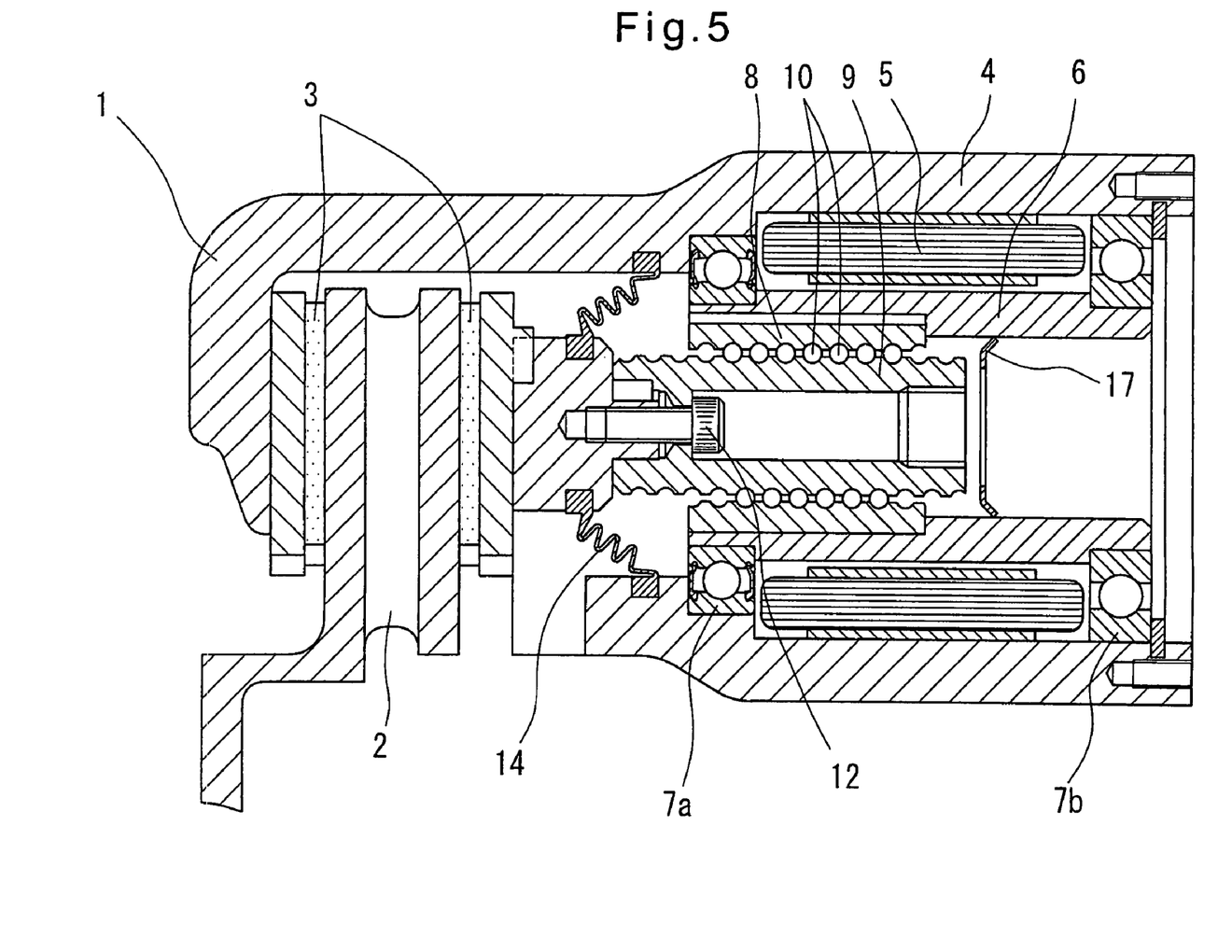
FIG. 5 is a vertical sectional view of the electric brake assembly of FIG. 1, showing how the worn brake pads of FIG. 5 are replaced with new ones.

As the brake pads 3 become worn and their thickness decreases, the threaded shaft 9 will be advanced a longer distance during braking. Thus, the head of the bolt 16, which is moving together with the threaded shaft 9, will abut the snap ring 17 as shown in FIG. 2A and further push the snap ring 17 axially forwardly. As the pads 3 become worn further, the snap ring 17 advances gradually forwardly. Thus, by the time the brake pads 3 are worn to an extent as shown in FIG. 4, the threaded shaft 9 and the snap ring 17 have advanced considerably from the initial position shown in FIG. 1.

When the brake pads 3 become worn, they can be replaced with new ones in the following manner. As shown in FIG. 4, when the pads 3 become worn considerably, threaded shaft 9 and the snap ring 17 are located far apart from the lid 15. In this state, after removing the lid 15 from the casing 4, and further removing the bolt 16 from the threaded shaft 9 (see FIG. 5), a tool is engaged in the holes 17b of the snap ring 17, and the snap ring 17 is compressed radially and pulled out of the rotor 6. In this state, the motor is reversed to move the threaded shaft 9 to its original position, and the brake pads 3 are replaced with new ones.

In this embodiment, the radially outer portion of the snap ring has a straight section as shown e.g. in FIGS. 2A and 2B, but it may have an arcuate section. Also, the axial one-way clutch according to the present invention is not limited to the snap ring 17 shown. Further, the driving force conversion mechanism is not limited to the ball screw as shown, either.

FIGS. 6 to 10 show the electric brake assembly according to the second embodiment, which is also a disc brake assembly including a disc rotor 2, brake pads 3 provided in a caliper 1 and disposed on both sides of the disc rotor 2 so as to be pressed against the disc rotor 2, and an electric motor including a stator 5 fixed to a radially inner surface of a casing 4 which is integral with the caliper 1, and a tubular rotor 6 rotatably supported on the casing 4 through bearings 7. The brake assembly shown further includes a ball screw as a driving force conversion mechanism which comprises a nut 8 fitted in the rotor 6 near its axial front end, and a threaded shaft 9 inserted in and in threaded engagement with the nut 8 through balls 10. A separate presser member 11 is mounted on and fixed to the axial front end of the threaded shaft 9 by means of a bolt 12. The presser member 11 is prevented from turning relative to one of the brake pads 3 by means of keys 13. The front opening of the casing 4 is sealed by a boot 14 provided between the caliper 1 and the presser member 11. The rear opening of the casing 4 is closed by a lid 15.

Figure 6:
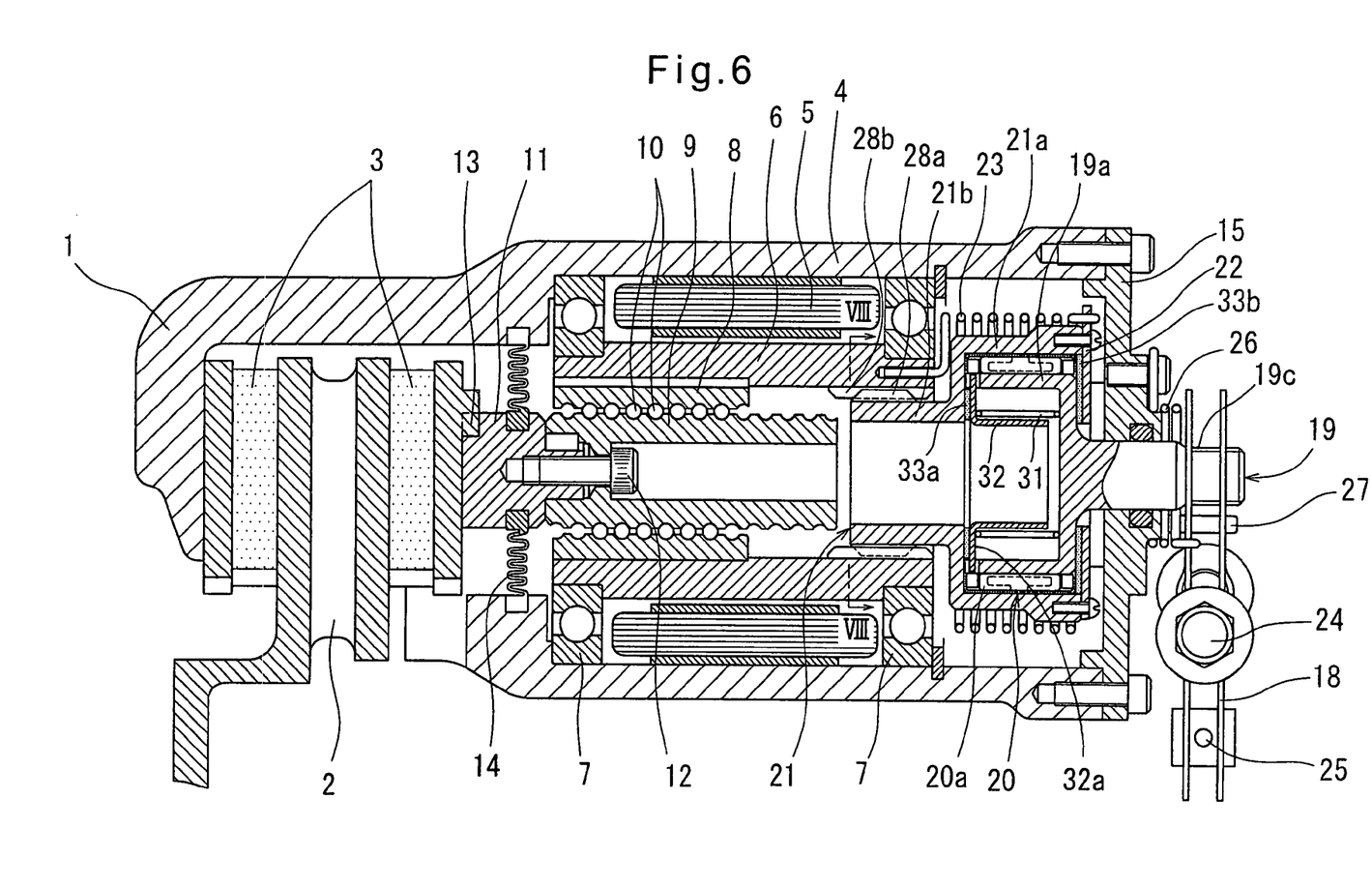
FIG. 6 is a vertical sectional view of an electric brake assembly according to a second embodiment of the present invention.

A drive shaft 19 extends through the lid 15 so as to be coaxial with the rotor 6. The drive shaft 19 is rotated by a parking brake lever 18. The drive shaft 19 has a large-diameter portion 19*a* having its radially outer surface coupled through a one-way clutch 20 comprising engaging elements in the form of rollers 20*a* to the radially inner surface of a rear large-diameter portion of an output shaft 21. When the parking brake lever 18 is operated, the drive shaft 19 rotates in a forward rotational direction. The rotation of the drive shaft 19 in this direction is transmitted through the one-way clutch 20 to the output shaft 21 and then to the rotor 6, so that the threaded shaft 9 advances to press, through the presser member 11, the brake pads 3 against the disc rotor 2.

At the rear end of the output shaft 21, a stopper ring 22 is provided to prevent the output shaft 21 from slipping out of the drive shaft 19. Between the stopper ring 22 and the rotor 6, a torsion coil spring 23 is provided to bias the rotor 6 in the reverse rotational direction by a predetermined angle after the rotor 6 has been rotated in the forward rotational direction by activating the electric motor or by operating the parking brake lever 18.

Figure 7:
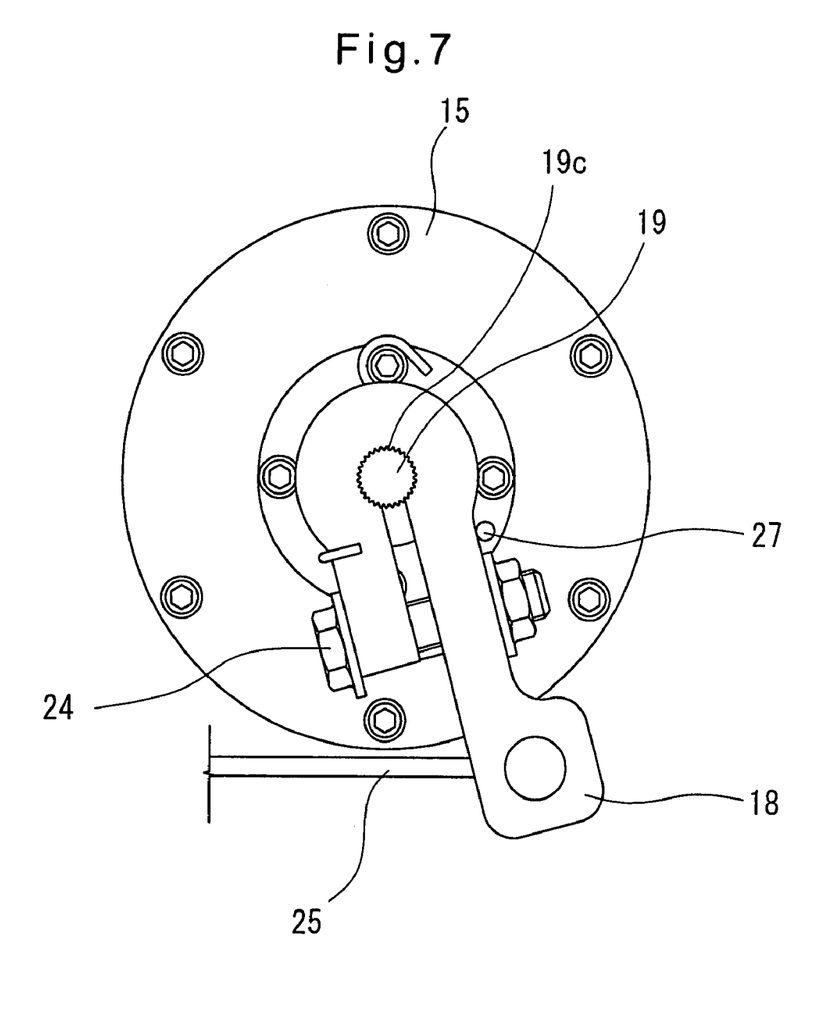
FIG. 7 is a side view of FIG. 6.

As shown in FIG. 7, the parking brake lever 18 comprises two arms embracing the rear end of the drive shaft 19 through serrations 19*c* and tightened by separate bolt-and-nut arrangements 24. The lever 18 is connected to a parking brake through a wire 25 so that when the parking brake is operated, the lever 18 is adapted to pivot in such a direction that the drive shaft 19 rotates in the forward rotational direction. When the parking brake is released, the lever 18 pivots in the reverse direction under the force of the torsion coil spring 26 until it abuts a stopper pin 27 secured to the casing 4.

Figure 8A:
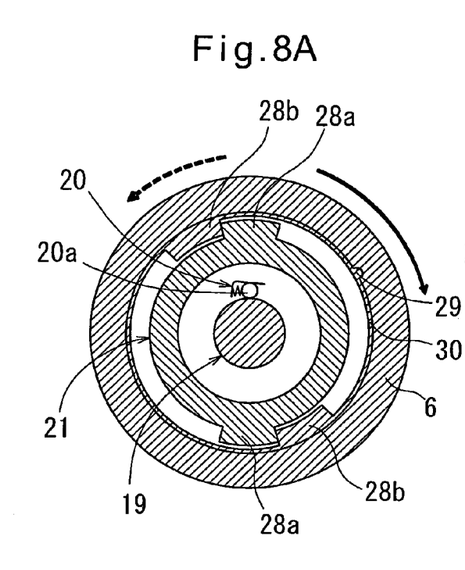
FIGS. 8A to 8D are schematic sectional views taken along line VIII-VIII of FIG. 6, showing the relative positions of the various elements of the brake assembly of the second embodiment when the electric brake and the parking brake are applied and released, respectively.

The output shaft 21 has a small-diameter front end that is inserted into the rear end of the rotor 6, and as shown in FIG. 8A, formed with two diametrically opposed protrusions 28*a* on the radially outer surface thereof. The rotor 6 has on its radially inner surface two diametrically opposed protrusions 28*b* that are circumferentially aligned with and engageable with the protrusions 28*a*. Thus, when the output shaft 21 is rotated in the forward rotational direction, its torque is transmitted to the rotor 6 through the protrusions 28*a* and 28*b*. But the output shaft 21 and the rotor 6 are allowed to rotate relative to each other by up to 180 degrees both in the forward and reverse rotational directions. The protrusions 28*b* are formed on an annular member 30 fitted in the rotor body and partially engaged in a groove formed in the rotor body so as not to rotate relative to the rotor body.

Figure 10A:
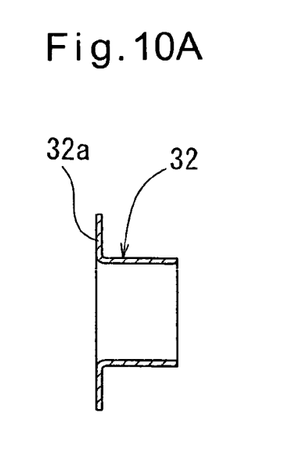
FIG. 10A is a vertical sectional view of a friction plate presser of FIG. 6.
Figure 10B:
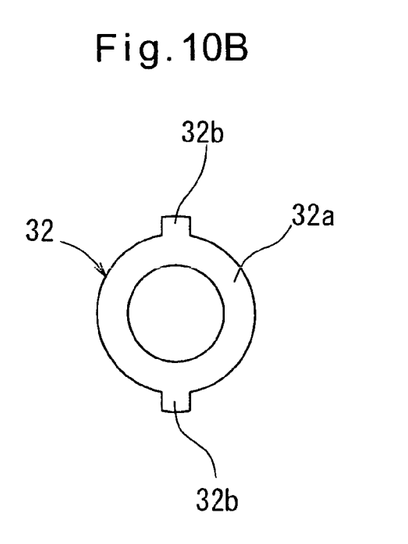
FIG. 10B is a side view of the friction plate presser of FIG. 10A.

As shown in FIG. 6, radially inside of the large-diameter portion 19*a* of the drive shaft 19, a friction plate presser 32 is provided which is biased forwardly by a compression coil spring 31. A friction plate 33*a* is sandwiched between a flange 32*a* of the friction plate presser 32 and the shoulder of the output shaft 21 defined at the front end of its large-diameter portion 21*a*. As shown in FIGS. 10A and 10B, the flange 32*a* of the friction plate presser 32 has two diametrically opposed protrusions 32*b* on its outer edge. The protrusions 32*b* are engaged in two diametrically opposed cutouts 19*b* formed in the front end face of the large-diameter portion 19*a* of the drive shaft 19 (see FIGS. 9A and 9B), thereby preventing the friction plate presser 32 from rotating relative to the drive shaft 19.

Another friction plate 33*b* is sandwiched between the stopper ring 22, which is fixed to the output shaft 19, and the shoulder of the drive shaft 19 defined at the rear end of its large-diameter portion 19*a*. The sum of the frictional force produced between the friction plate 33*a* and the output shaft 21 and the frictional force produced between the friction plate 33*b* and the drive shaft 19 is determined to be greater than the biasing force of the torsion coil spring 23, which tends to rotate the rotor 6 in the reverse rotational direction.

Now referring to FIGS. 8A to 8D, the operation of the second embodiment is described. In FIGS. 8A to 8D, it is to be understood that the clockwise arrows indicate the forward rotational direction and thus the counterclockwise arrows indicate the reverse rotational direction. Also, the solid arrows indicate the rotation of the rotor 6 while the phantom arrows indicate the direction of the biasing force of the torsion coil spring 23.

First, when the electric motor is activated to rotate the rotor 6, only the rotor 6 rotates while twisting the torsion coil spring 23 until its protrusions 28*b* abut the circumferentially rear ends of the respective protrusions 28*a* of the output shaft 21 as shown in FIG. 8A. Thereafter, the rotor 6 and the output shaft 21 rotate together in the forward rotational direction. The moment the output shaft 21 begins to rotate in the forward direction, the one-way clutch 20 disengages. Thus, the output shaft 21 can keep rotating in the forward direction together with the rotor 6 against the combined frictional force produced by the friction plates 33*a* and 33*b* because the driving force of the electric motor is sufficiently greater than the combined frictional force produced by the friction plates 33*a* and 33*b*.

Figure 8B:
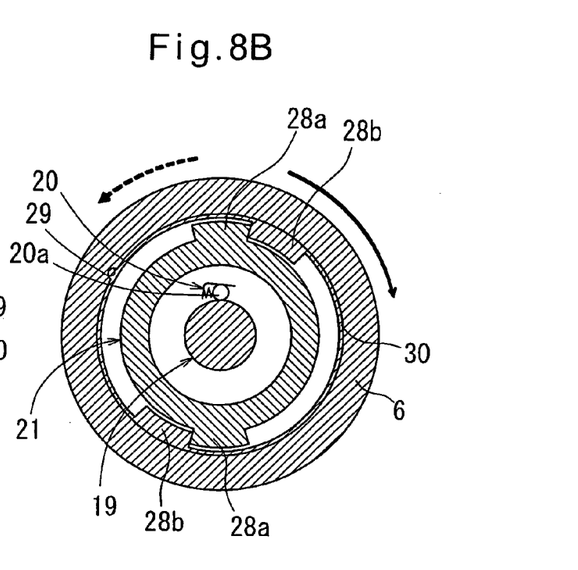
Figure 8C:
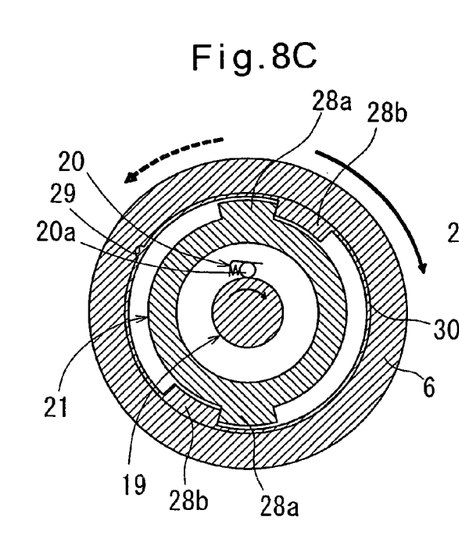

When the electric motor is deactivated thereafter, the rotor 6 is allowed to rotate in the reverse direction under the biasing force of the torsion coil spring 23 relative to the output shaft 21. When the rotor 6 has rotated by about 180 degrees in the reverse direction relative to the output shaft 21, its protrusions 28*b* will abut the protrusions 28*a* of the output shaft 21 as shown in FIG. 8B. The output shaft 21 thus begins to rotate in the reverse rotational direction together with the rotor 6. But the moment the output shaft 21 begins to rotate in the reverse rotational direction, the one-way clutch 20 will engage, thus preventing any further reverse rotation of the output shaft 21 and thus the rotor 6. Thus, after the electric motor has been deactivated, the rotor 6 can rotate in the reverse rotational direction by about 180 degrees, so that the threaded shaft 9 can retract to such an extent that the brake pads 3 are sufficiently separated from the disc rotor 2. But the rotor 6 cannot rotate in the reverse rotational direction any further.

When the parking brake is operated, the drive shaft 19 is rotated in the forward rotational direction. The moment the drive shaft 19 begins to rotate in the forward rotational direction, the one-way clutch 20 engages, so that the output shaft 21 rotates in the forward rotational direction together with the drive shaft 19. Since the protrusions 28*a* of the output shaft are in abutment with the circumferentially rear ends of the protrusions 28*b* of the rotor 6 in this state (see FIG. 8C), the rotor 6 also rotates in the forward rotational direction.

Figure 8D:
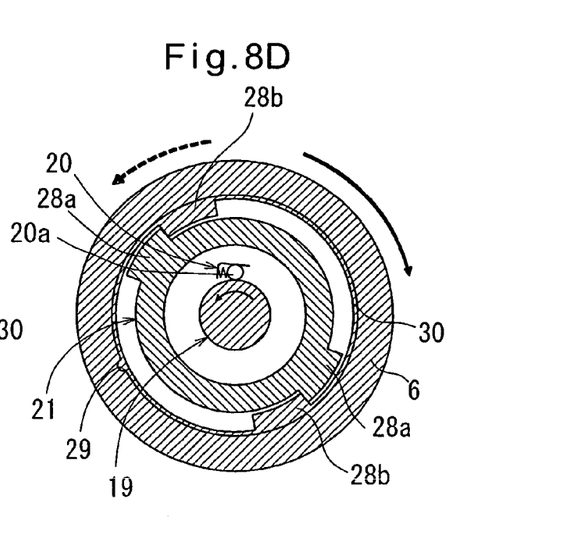
Figure 9A:
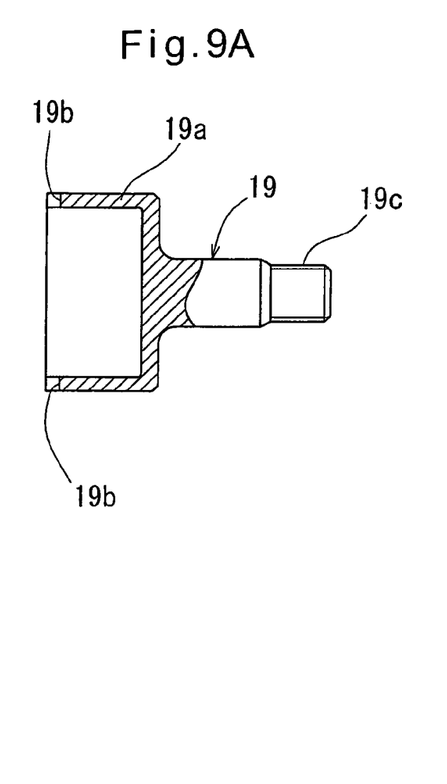
FIG. 9A is a front view, partially in vertical section, of a drive shaft of FIG. 6.
Figure 9B:
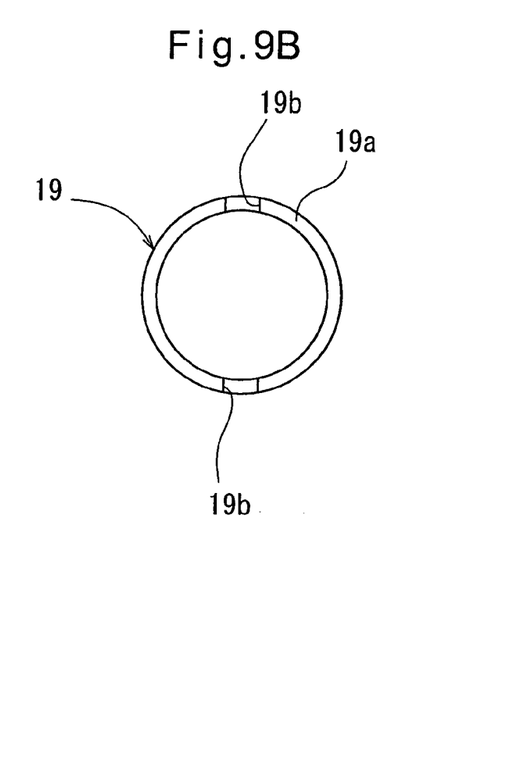
FIG. 9B is a side view of the drive shaft of FIG. 9A.

When the parking brake is released thereafter, the parking brake lever 18 is pivoted in the reverse direction under the force of the torsion coil spring 26, causing the drive shaft 19 to also rotate in the reverse rotational direction. Although the one-way clutch 20 disengages when the drive shaft 19 rotates in the reverse rotational direction (see FIG. 8D), since the combined frictional force produced by the friction plates 33*a* and 33*b* is greater than the biasing force of the torsion coil spring 23, when the drive shaft 19 rotates in the reverse rotational direction, torque is transmitted to the output shaft 21 through the friction plates 33*a* and 33*b*, causing the output shaft 21 to rotate in the reverse rotational direction by a predetermined angle. When the output shaft 21 rotates in the reverse rotational direction, the rotor 6 also rotates in the reverse rotational direction under the biasing force of the torsion coil spring 23 with its protrusions 28b in abutment with the protrusions 28a of the output shaft 21 as shown in FIG. 8D. Thus, the threaded shaft 9 retracts, allowing the brake pads 3 to separate from the disc rotor 2.

Thus, either when the electric motor is deactivated or when the parking brake is released, the rotor 6 rotates in the reverse direction under the biasing force of the torsion coil spring 23 by a predetermined angle, thereby causing the threaded shaft 9 to retract, and allowing the brake pads 3 to separate from the disc rotor 2. As the brake pads 3 become thin due to wear, the threaded shaft 9 advances to a greater degree to make up for the reduction in thickness of the pads 3 when the brake is applied. When the brake is released thereafter, the threaded shaft 9 retracts to keep constant gaps between the brake pads 3 and the disc rotor 2 irrespective of the thickness of the pads 3.

When the brake pads 3 become worn to a certain extent, they can be easily dismounted from the brake assembly for replacement by removing the parking brake lever 18 and rotating the electric motor in the reverse direction until the threaded shaft 9 retracts to its original position.

In the embodiment, the two diametrically opposed protrusions 28a and the two diametrically opposed protrusions 28b are provided on the output shaft 21 and the rotor 6, respectively. But one of the protrusions 28a and one of the protrusions 28b may be omitted. Also, the two protrusions 28a and the two protrusions 28b may not be diametrically opposed to each other. Further, the protrusions 28a and 28b may not be provided on the radially outer surface of the output shaft 21 and the radially inner surface of the rotor 6, respectively. For example, they may be provided on opposed end faces of the output shaft 21 and the rotor 6.

What is claimed is:

1. An electric brake assembly comprising:
    an electric motor including a rotary member;
    a linearly movable member;
    a first brake member coupled to said linearly movable member;
    a second brake member;
    a driving force conversion mechanism for converting a rotary motion of said rotary member to a linear motion of said linearly movable member in forward and backward directions, said forward direction being such a direction that said first brake member is moved toward and pressed against said second brake member, said backward direction being such a direction that said first brake member separates from said second brake member; and
    a one-way clutch that allows the linear motion of said linearly movable member in said forward direction and restricts the linear motion of said linearly movable member in said backward direction;
    wherein said rotary member is a cylindrical member;
    wherein said driving force conversion mechanism comprises a thread mechanism provided on a radially inner surface of said cylindrical rotary member;
    wherein said linearly movable member extends through said cylindrical rotary member and is coupled thereto through said thread mechanism;
    wherein said forward and backward directions are parallel to an axis of said cylindrical rotary member; and
    wherein said one-way clutch is rotatably mounted on said linearly movable member and structured to restrict the linear motion of said one-way clutch in said backward direction relative to said cylindrical rotary member and allow the linear motion of said one-way clutch in said forward direction relative to said cylindrical rotary member, by axially engaging said radially inner surface of said cylindrical rotary member while moving in an axial direction.

2. The electric brake assembly of claim 1 wherein an axial play is present between said one-way clutch and said linearly movable member.

3. The electric brake assembly of claim 1 wherein said thread mechanism is a ball screw.

4. The electric brake assembly of claim 1 wherein said one-way clutch is an annular snap ring having two opposed ends that are circumferentially spaced apart from each other by a cutout, said snap ring having a radially inner edge that is out of contact with said linearly movable member, and a radially outer edge that is pressed against said radially inner surface of said cylindrical rotary member along a contact line at an acute angle with respect to a portion of said radially inner surface of said cylindrical rotary member forwardly of said contact line.

5. The electric brake assembly of claim 1 wherein a portion of said radially inner surface of said cylindrical rotary member where said one-way clutch engages is a rough surface.

6. The electric brake assembly of claim 5 wherein said rough surface has a roughness average RA of 6.3 to 50 micrometers.

7. An electric brake assembly comprising an electric motor including a rotary member;
    a linearly movable member;
    a first brake member coupled to said linearly movable member;
    a second brake member;
    a driving force conversion mechanism for converting a rotary motion of said rotary member to a linear motion of said linearly movable member in forward and backward directions, said forward direction being such a direction that said first brake member is moved toward and pressed against said second brake member, said backward direction being such a direction that said first brake member separates from said second brake member; and
    a one-way clutch that allows the linear motion of said linearly movable member in said forward direction and restricts the linear motion of said linearly movable member in said backward direction;
    wherein said rotary member is a cylindrical member;
    wherein said driving force conversion mechanism comprises a thread mechanism provided on a radially inner surface of said cylindrical rotary member;
    wherein said linearly movable member extends through said cylindrical rotary member and is coupled thereto through said thread mechanism;
    wherein said forward and backward directions are parallel to an axis of said cylindrical rotary member;
    wherein said one-way clutch comprises a member engaging said radially inner surface of said cylindrical rotary member so as to be rotatable relative to said linearly movable member;
    wherein said one-way clutch is an annular snap ring having two opposed ends that are circumferentially spaced apart from each other by a cutout;
    wherein said snap ring has a radially inner edge that is out of contact with said linearly movable member, and a radially outer edge that is pressed against said radially inner surface of said cylindrical rotary member along a contact line at an acute angle with respect to a portion of said radially inner surface of said cylindrical rotary member forwardly of said contact line.

8. The electric brake assembly of claim 7 wherein said snap ring is made of spring steel.

* * * * *